US012444348B2

(12) United States Patent
Ohira

(10) Patent No.: US 12,444,348 B2
(45) Date of Patent: Oct. 14, 2025

(54) DISPLAY SYSTEM

(71) Applicant: OHIRA TECH LTD., Kawasaki (JP)

(72) Inventor: Takayuki Ohira, Yokohama (JP)

(73) Assignee: OHIRA TECH LTD., Kawasaki (JP)

( * ) Notice: Subject to any disclaimer, the term of this patent is extended or adjusted under 35 U.S.C. 154(b) by 0 days.

(21) Appl. No.: 18/835,689

(22) PCT Filed: Feb. 3, 2023

(86) PCT No.: PCT/JP2023/003527

§ 371 (c)(1),
(2) Date: Aug. 2, 2024

(87) PCT Pub. No.: WO2023/149535

PCT Pub. Date: Aug. 10, 2023

(65) Prior Publication Data

US 2025/0157394 A1 May 15, 2025

(30) Foreign Application Priority Data

Feb. 4, 2022 (JP) ................................ 2022-016279

(51) Int. Cl.
*G09G 3/3233* (2016.01)
*G09G 3/32* (2016.01)

(52) U.S. Cl.
CPC ....... *G09G 3/32* (2013.01); *G09G 2320/0238* (2013.01); *G09G 2320/064* (2013.01); *G09G 2320/0686* (2013.01)

(58) Field of Classification Search
CPC ............ G09G 3/32; G09G 2320/0238; G09G 230/064; G09G 2320/0686; G09G 5/10
See application file for complete search history.

(56) References Cited

U.S. PATENT DOCUMENTS

| | | | |
|---|---|---|---|
| 2009/0147116 A1 | 6/2009 | Koyama et al. |
| 2010/0328365 A1 | 12/2010 | Ikeda et al. |
| 2012/0081034 A1 | 4/2012 | Liao |
| 2015/0319416 A1 | 11/2015 | Nakajima |

(Continued)

FOREIGN PATENT DOCUMENTS

| | | | |
|---|---|---|---|
| JP | 2003005674 A | 1/2003 |
| JP | 2009141813 A | 6/2009 |

(Continued)

OTHER PUBLICATIONS

International Search Report for PCT/JP2023/003527, of which the subject application is a U.S. national phase.

(Continued)

*Primary Examiner* — Abdul-Samad A Adediran
(74) *Attorney, Agent, or Firm* — Wood, Phillips, Katz, Clark & Mortimer

(57) ABSTRACT

A display system includes: a display device including a plurality of self-luminous elements; and a control device configured to control an operation of the display device. The control device is configured to cause the display device to: display a normal video through use of gradations of up to luminance equal to or lower than normal maximum luminance; and display a part of a video, as required, through use of a boost light emission in which some of the self-luminous elements are caused to emit light at luminance exceeding the normal maximum luminance.

15 Claims, 5 Drawing Sheets

(56) References Cited

U.S. PATENT DOCUMENTS

| | | | | |
|---|---|---|---|---|
| 2021/0241678 | A1 | 8/2021 | Asamura et al. | |
| 2022/0130347 | A1* | 4/2022 | Niizuma .................. | G09G 5/10 |

FOREIGN PATENT DOCUMENTS

| | | | |
|---|---|---|---|
| JP | 2011013256 | A | 1/2011 |
| WO | 2014203869 | A1 | 12/2014 |
| WO | 2020008585 | A1 | 1/2020 |

OTHER PUBLICATIONS

English language translation of the Written Opinion of the International Searching Authority for PCT/JP2023/003527, of which the subject application is a U.S. national phase.

* cited by examiner

DISPLAY SYSTEM

TECHNICAL FIELD

The present invention relates to a display system.

BACKGROUND ART

As a display device for displaying a video, there has been known a device formed by arranging a large number of self-luminous elements such as light-emitting diodes (LEDs). For example, in JP 2003-005674 A, there is disclosed a technology relating to such an LED display. When self-luminous elements are used, a deep black color can be expressed by completely turning off the self-luminous elements, and hence it may be possible to achieve video display that is superior to that of, for example, a liquid crystal display, which may cause so-called black level degradation.

SUMMARY OF INVENTION

The present invention has an object to provide a display system capable of excellent video expression.

According to an aspect of the present invention, there is provided a display system including: a display device including a plurality of self-luminous elements; and a control device configured to control an operation of the display device, wherein the control device is configured to cause the display device to: display a normal video through use of gradations of up to luminance equal to or lower than normal maximum luminance; and display a part of a video, as required, through use of a boost light emission in which some of the plurality of self-luminous elements are caused to emit light at luminance exceeding the normal maximum luminance.

According to the present invention, the display system capable of excellent video expression can be provided.

DESCRIPTION OF EMBODIMENTS

One embodiment of the present disclosure is described with reference to the accompanying drawings. This embodiment relates to a display system for displaying a video. In particular, this embodiment relates to a display system in which, while implementing display without so-called black level degradation through use of self-luminous elements, it is possible to cause self-luminous elements to emit light at high luminance for a limited number of specific pixels to display a video in which, for example, only bright spots are caused to sharply shine.

The display system is based on display in a normal mode of displaying a video through use of gradations of from no light emission to luminance equal to normal maximum luminance. The video displayed in the normal mode is herein referred to as "normal video." The display system is also configured to be able to display videos in a boost mode of displaying a video by causing the self-luminous elements of some pixels to emit light at luminance exceeding the normal maximum luminance. Causing the self-luminous elements to emit light at luminance exceeding the normal maximum luminance is herein referred to as "boost light emission." The display system is configured to be able to display a normal video by superimposing the boost light emission thereon.

Conceivable display examples using of the display system according to this embodiment are given below. For example, in displaying of a video of a sunset, only a portion of the sun is displayed at high luminance in the boost mode. In displaying of a video including a lighthouse is displayed, a light of the lighthouse is caused to shine intensely in the boost mode only at a moment at which the light is directed toward spectators. In displaying of a video of a starry sky, only a bright star such as Venus is displayed at high luminance in the boost mode.

In the display system according to this embodiment, the boost light emission is limited by a predetermined rule so as to achieve a predetermined purpose such as to keep an increase in power consumption due to high-luminance display within a predetermined range.

[Outline of System Configuration]

Figure 1:
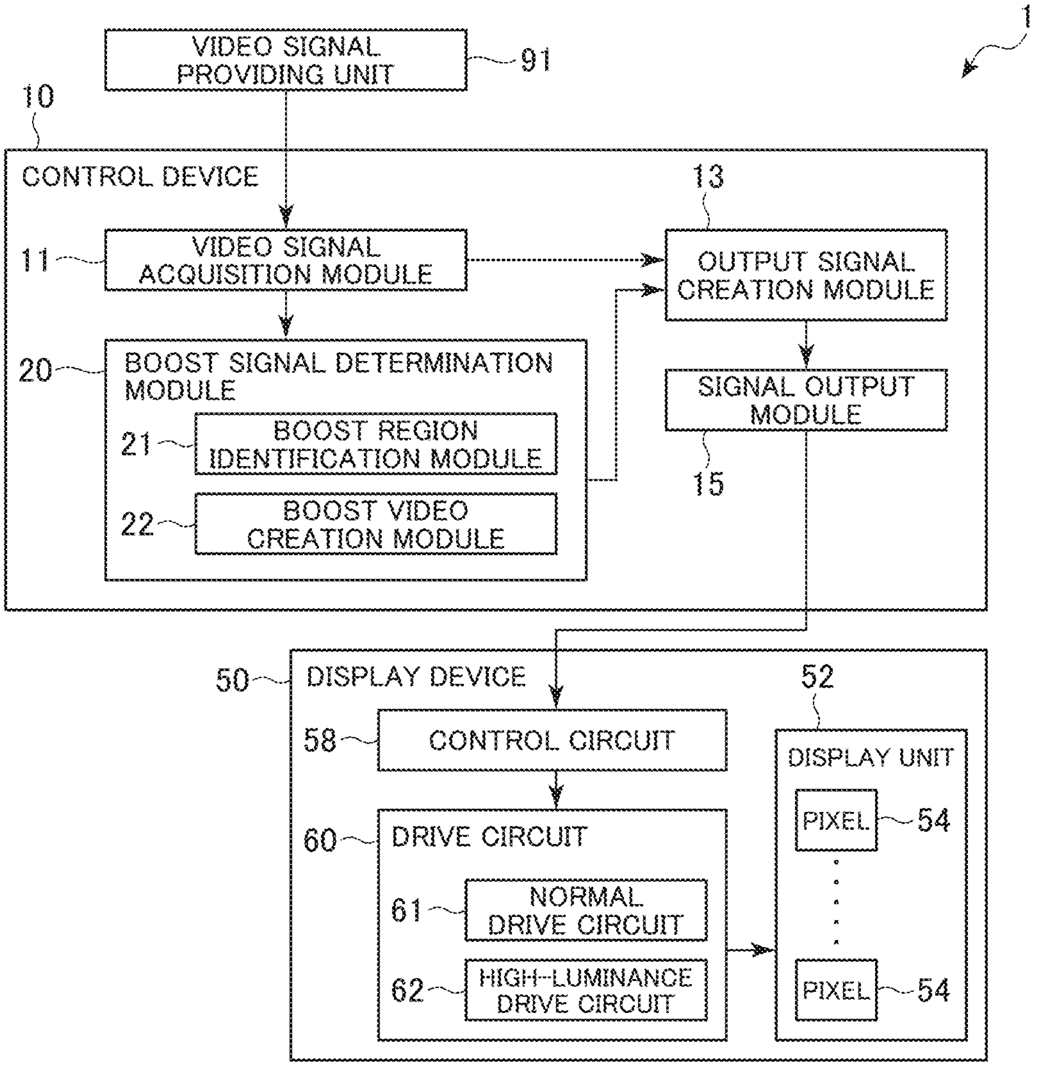
FIG. 1 is a block diagram for illustrating an outline of a configuration example of a display system according to one embodiment of the present disclosure.

FIG. 1 is a block diagram for illustrating an outline of a configuration example of a display system 1 according to this embodiment. The display system 1 includes a control device 10 and a display device 50. The control device 10 acquires a video signal and controls an operation of the display device 50 so that the display device 50 displays a video based on the video signal.

The display device 50 includes self-luminous elements. For example, light emitting diodes (LEDs) may be used as the self-luminous elements. The LEDs may include those using semiconductors and those using organic compounds. For example, one pixel 54 is formed through use of self-luminous elements of three colors, namely, red, green, and blue, and a large number of those pixels 54 are arranged in a display unit 52. The self-luminous elements forming each pixel 54 are not limited thereto, and, for example, may be formed of four colors, namely, red, green, blue, and white, may include a self-luminous element for high luminance and a self-luminous element for low luminance, or may have another combination.

The display unit 52 is based on the display in the normal mode of displaying a normal video through use of gradations of from no light emission to the luminance equal to the normal maximum luminance. The display unit 52 is further configured to be able to operate in the boost mode of displaying a video by subjecting the self-luminous elements of some pixels 54 to the boost light emission at the luminance exceeding the normal maximum luminance.

The display device 50 includes a drive circuit 60 that drives each pixel 54 of the display unit 52. The drive circuit 60 includes a normal drive circuit 61 for the light emission of the self-luminous elements in the normal mode and a high-luminance drive circuit 62 for the boost light emission of the self-luminous elements in the boost mode. The display device 50 includes a control circuit 58 configured to control the drive circuit 60 based on a video signal.

The control device 10 is a computer. The control device 10 includes an integrated circuit such as a CPU, an ASIC, an FPGA, or a GPU, and operates in accordance with a program recorded in, for example, a storage device or the circuit. The control device 10 has functions serving as a video signal acquisition module 11, a boost signal determination module 20, an output signal creation module 13, and a signal output module 15.

The video signal acquisition module 11 acquires a video signal from a video signal providing unit 91 external to the control device 10. The video signal providing unit 91 may be of any type that provides a video signal relating to the video to be displayed on the display device 50. The video signal providing unit 91 may be, for example, a camera, a video reproduction device, or any one of various devices connected through a network.

The boost signal determination module 20 identifies, based on the video signal acquired by the video signal acquisition module 11, a region to be displayed in the boost mode within the video to be displayed on the display device 50, and creates a required signal.

The output signal creation module 13 creates an output signal relating to the video to be displayed on the display device 50 based on the video signal acquired by the video signal acquisition module 11 and the signal in the boost mode created by the boost signal determination module 20. When the boost mode is not used, the above-mentioned video is a video in a general normal mode based on, for example, the video signal acquired from the video signal acquisition module 11. When the boost mode is used, the above-mentioned video is a video in which the video in the normal mode partially includes a high-luminance portion in the boost mode.

The signal output module 15 outputs the output signal created by the output signal creation module 13 to the display device 50. The display device 50 displays a video based on this output signal.

The boost signal determination module 20 includes a boost region identification module 21 and a boost video creation module 22. The boost region identification module 21 determines, based on the video signal acquired from the video signal acquisition module 11, a region of the video to be displayed in the boost mode as a boost region. In this case, a predetermined limitation is applied to the boost region so as to prevent the boost region from becoming too wide. The boost video creation module 22 determines luminance or the like of the self-luminous elements in the boost region based on the boost region identified by the boost region identification module 21, and creates a boost mode video signal.

[Outline of Operation of Control Device]

Figure 2:
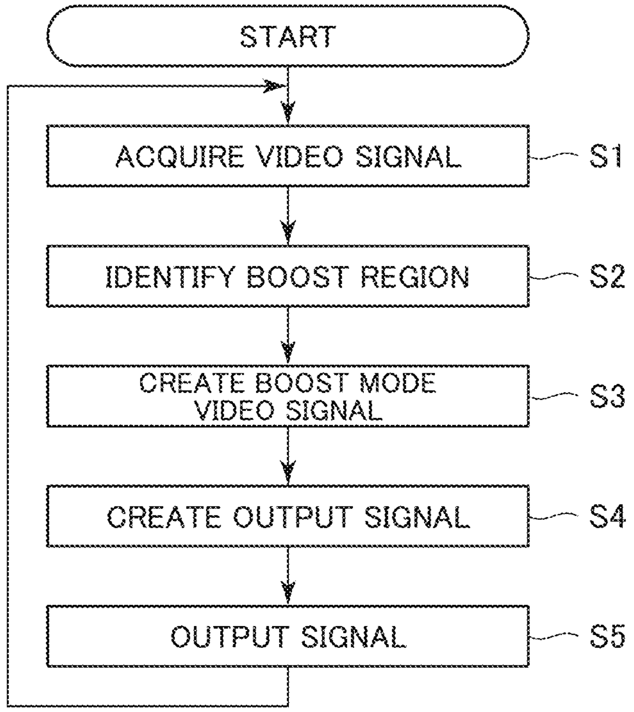
FIG. 2 is a flow chart for illustrating an outline of an operation example of a control device.

An outline of an operation of the control device 10 is described. FIG. 2 is a flow chart for illustrating the outline of the operation of the control device 10. In Step S1, the video signal acquisition module 11 acquires a video signal from outside the control device 10. In Step S2, the boost region identification module 21 identifies a boost region to be displayed in the boost mode based on the video signal acquired by the video signal acquisition module 11. In Step S3, the boost video creation module 22 determines the luminance or the like of the boost region identified by the boost region identification module 21, and creates a boost mode video signal. In Step S4, the output signal creation module 13 creates an output signal relating to a video to be displayed on the display device 50 based on the video signal acquired from the video signal acquisition module 11 and the boost mode video signal acquired from the boost video creation module 22. In Step S5, the signal output module 15 outputs the output signal created by the output signal creation module 13 to the display device 50. The control circuit 58 of the display device 50, which has received the output signal from the signal output module 15, controls the drive circuit 60 to operate the display unit 52 and cause the display unit 52 to display a video based on the output signal.

[Regarding Driving Method for Display Device]

A configuration of the display device 50 that can display a video in the normal mode and the boost mode is described. Two examples are given below. Those are examples, and other configurations may be used as long as similar functions can be achieved.

<First Configuration Example>

Figure 3:
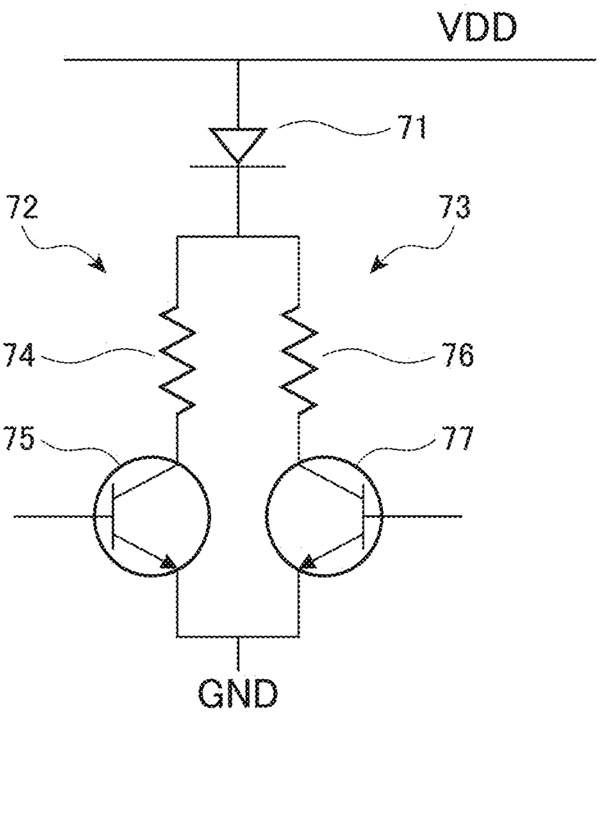
FIG. 3 is a diagram for illustrating an outline of a circuit configuration relating to one LED element included in one pixel in a first configuration example of a display device.

FIG. 3 is an illustration of an outline of a circuit configuration relating to one LED element 71 included in one pixel 54 in a first configuration example. In this circuit, a low current circuit 72 for the normal mode and a high current circuit 73 for the boost mode, which are provided in parallel, are connected to each LED element 71. The low current circuit 72 includes a large-resistance-value resistor element 74 and a first switching element 75 connected in series. The high current circuit 73 includes a small-resistance-value resistor element 76 and a second switching element 77 connected in series. Through use of the low current circuit 72, a relatively small electric current flows through the LED element 71 to perform display at normal luminance. Meanwhile, through use of the high current circuit 73, a relatively large electric current flows through the LED element 71 to perform display at high luminance. The electric current flowing through the high current circuit 73 may be any number of times larger than the electric current flowing through the low current circuit 72, and may be, for example, 10 times or 100 times.

For example, in the normal mode, pulse width modulation (PWM) control is performed through use of the first switching element 75 of the low current circuit 72, and hence a normal video in the normal mode can be displayed. At this time, the second switching element 77 is in an off state. In the pixel 54 in the boost mode, PWM control is performed through use of the second switching element 77 of the high current circuit 73, and hence high-luminance display in the boost mode can be performed. In this example, the low current circuit 72 forms a part of the normal drive circuit 61, and the high current circuit 73 forms a part of the high-luminance drive circuit 62. In this case, the maximum luminance at a time of using the low current circuit 72 is set as the normal maximum luminance.

The above-mentioned example is an example in which the low current circuit 72 and the high current circuit 73 are selectively used in the normal mode and the boost mode, but the present invention is not limited thereto. For example, in the normal mode, both the low current circuit 72 and the high current circuit 73 may be utilized to display a video with a high dynamic range. However, in the normal mode, even when the high current circuit 73 is used, the display luminance is limited to luminance equal to or lower than predetermined normal maximum luminance. In this case, in the pixel 54 in the boost mode, a video is displayed at high luminance by performing light emission at high luminance exceeding the normal maximum luminance through use of the high current circuit 73 or through use of the low current circuit 72 and the high current circuit 73.

<Second Configuration Example>

Figure 4:
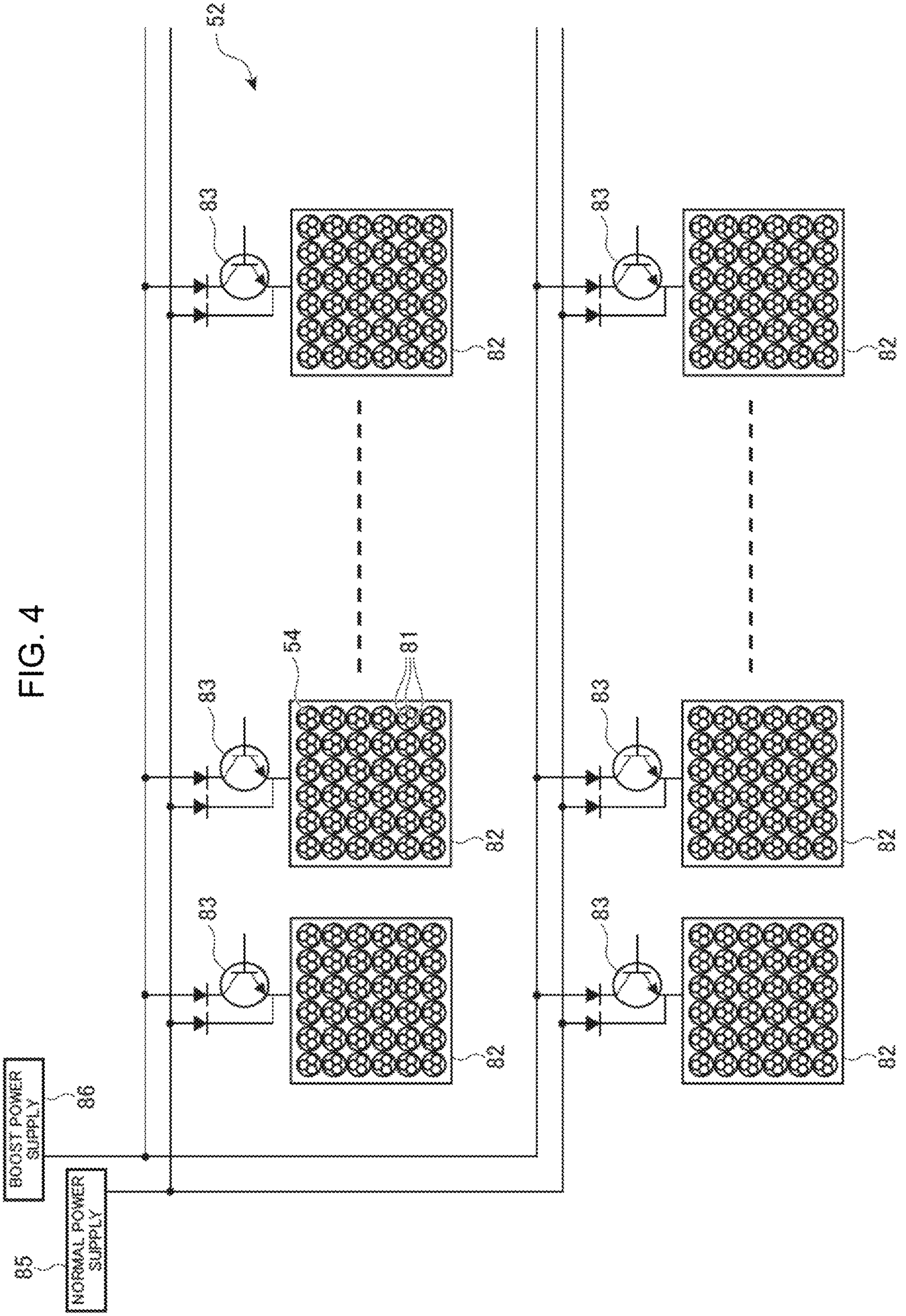
FIG. 4 is a diagram for illustrating an outline of a circuit configuration relating to a large number of LED elements included in a large number of pixels in a second configuration example of the display device.

FIG. 4 is a diagram for illustrating an outline of a second configuration example. FIG. 4 is an illustration of the outline of a circuit regarding a large number of LED elements 81 included in a large number of pixels 54. In this circuit, a plurality of LED drivers 82 that each can control operations of a plurality of pixels 54 are used. For example, one LED driver 82 can control the operations of the LED elements 81 of 256 pixels. In this case, the display is controlled by one LED driver 82 for each block of 256 pixels. The LED driver 82 controls luminance of each LED element 81 through use of the PWM control.

A power supply voltage to be input to each LED driver 82 can be changed. In this configuration example, a relatively-low-voltage normal power supply 85 and a relatively-high-voltage boost power supply 86 are provided. Each LED driver 82 is connected to the normal power supply 85. In addition, each LED driver 82 is connected to the boost power supply 86 through a switching element 83.

In the normal mode, the LED elements 81 are driven through use of the normal power supply 85 to perform display at normal luminance. In a block including a boost region to be displayed in the boost mode, the LED driver 82 that controls the block is connected to the boost power supply 86 by the switching element 83. As a result, in this block, the LED elements 81 are driven through use of the boost power supply 86, and the display can be performed at high luminance.

In this case, a high voltage is applied to the LED elements 81 for all the pixels 54 in this block, and hence the luminance of the pixels 54 in a region other than the boost region is adjusted to luminance corresponding to normal display by adjusting a luminance command signal level. For example, when a voltage value at a time of using the boost power supply 86 is 100 times larger than that at a time of using the normal power supply 85, the luminance command signal level for the region other than the boost region is adjusted to 1/100. At this time, in the boost region, display at luminance that is 100 times higher than that of the normal display is possible. In this case, gradations are reduced in the region other than the boost region, but in the vicinity of the LED elements 81 emitting light at high luminance, the LED elements 81 that shine at high luminance are so dazzling that there occurs no substantial problem even when the gradations of low luminance are impaired.

In this example, the LED driver 82 operated by the normal power supply 85 forms a part of the normal drive circuit 61, and the LED driver 82 operated by the boost power supply 86 forms a part of the high-luminance drive circuit 62. In this case, the maximum luminance at a time of using the normal power supply 85 is set as the normal maximum luminance.

In the first configuration example illustrated in FIG. 3, it is possible to finely control each pixel 54 while increasing the overall dynamic range. Meanwhile, two lines of drive circuits are required, and hence the circuits become relatively more complicated and relatively more expensive. In the second configuration example illustrated in FIG. 4, the circuits can be relatively simplified compared to the first configuration example, and can be achieved at a relatively low cost.

[Regarding Identification of Boost Region]

An example of a method of identifying the boost region, which is performed in Step S2 by the boost region identification module 21, is described. Three examples are given below. Those are examples, and other methods may be used as long as similar functions can be achieved.

<First Method>

In a first method, the video signal acquisition module 11 acquires two video signals, namely, a main video signal and an auxiliary video signal. The auxiliary video signal is a video signal relating to a video regarding the same object as that of a video relating to the main video signal, the video being acquired under a low exposure condition. The auxiliary video signal is, for example, a signal relating to a video captured by shortening an exposure time or narrowing an aperture. The video of the auxiliary video signal shows only subjects having high luminance, and only high-luminance portions have luminance information. In the first method, a region including luminance information or a region having luminance information exceeding a predetermined value in the auxiliary video signal can be identified as the boost region. The luminance, colors, and the like of the display in the boost mode can be determined based on the auxiliary video signal.

Figure 5A:
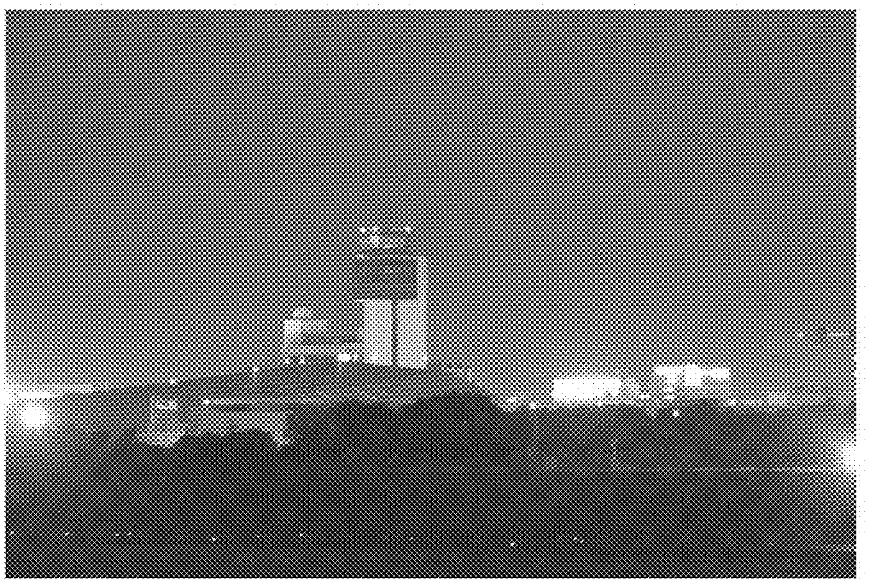
FIG. 5A is a photograph for showing an example of a video relating to a main video signal.
Figure 5B:
FIG. 5B is a photograph for showing an example of a video relating to an auxiliary video signal corresponding to the main video signal.

FIG. 5A shows an example of a video relating to the main video signal, and FIG. 5B shows an example of a video relating to the auxiliary video signal corresponding thereto. The video relating to the main video signal, which is shown in FIG. 5A, is natural as a video, and the display in the normal mode is performed based on the main video signal. However, in the main video signal, high-luminance portions have highlights blown out, making it difficult to identify regions to be displayed in the boost mode, and have lost luminance information and color information due to saturation. Meanwhile, the auxiliary video signal facilitates the identification of the regions to be displayed in the boost mode, and also abundantly includes luminance information and color information.

<Second Method>

In a second method, the video signal acquisition module 11 acquires one video signal corresponding to the main video signal in the first method. In the second method, the video signal acquisition module 11 identifies the boost region based on the luminance of this video signal. For example, pixels having a luminance value equal to or larger than a predetermined luminance value can be identified based on the video signal, and a region regarding the identified pixels or a part of the region can be identified as the boost region. In addition, the luminance and colors of the display in the boost mode, for example, can be determined based on the area of the region as a whole and the luminance, colors, and the like of a periphery thereof.

<Third Method>

A third method is based on the second method, and in addition, an image recognition technology using an artificial intelligence (AI) or the like is used to identify high-luminance subjects such as lights and the sun. A region relating to a luminance subject can be identified as the boost region. In the identification of a high-luminance subject, for example, a portion in which flare peculiar to a highly bright spot is reflected and it is determined to be obvious that the actual object is extremely bright may be identified. The portion identified by the third method may be added to the region identified by the second method, a part of the region identified by the second method may be selected by the third method. In another case, the region identified by the second method and the portion identified by the third method may be respectively given identifiers and handled separately. This method may also be used in combination with the first method.

<Comparison of Methods>

In the first method, there is a large amount of information, an appropriate boost region can be identified with high accuracy, and sufficient luminance information, color information, and the like can also be obtained, and hence it is possible to perform more satisfactory display. Meanwhile, the first method requires multi-step exposure photography. In the second method and the third method, a normal video format can be used as it is, and special photography is not required.

[Regarding Boost Region Limitation]

For various reasons, the boost mode may be required to be used in a suppressed manner. In view of this, in this embodiment, when the boost region is identified as described above, a predetermined limitation is applied. Three examples of this limitation are given. Those are examples, and other methods may be used for the same purpose.

<First Limitation Method>

In the boost mode, a larger electric current flows with more power consumption and more heat generation amount than in the normal mode. It is required to design a power supply circuit corresponding to a magnitude of the electric current or the like, and a heat dissipation design corresponding to the heat generation amount is also required. In view of this, in the display system 1 according to this embodiment, the region to which the boost mode is applied is limited as required so that total power consumption and a total heat generation amount are equal to or smaller than a predetermined value.

For example, the area, namely, the number of pixels, of the region in which the display in the boost mode is performed is limited. For example, control can be performed so that a maximum current value in the boost mode is 10 times larger than a maximum current value in the normal mode and the number of pixels to which the boost mode is applied is limited to 10% or smaller of a total number of pixels. With this control, when the maximum current value of each pixel in the normal mode is represented by I and the total number of pixels is represented by N, a maximum value of a total current value is:

$$I\cdot(1-0.1)N+10I\cdot0.1N=1.9I\cdot N$$

and is suppressed to 1.9 times larger than a maximum value I·N in the normal mode. Assuming that a maximum number of pixels is not limited, the maximum value of the total current value is 10I·N, which can be 10 times larger than the maximum value in the normal mode, and a power supply circuit design and a heat dissipation design suited to such a maximum value are required. In other words, the display device 50 is designed to be able to cause all the self-luminous elements to simultaneously emit light at the normal maximum luminance, but is not designed to be able to cause all the self-luminous elements to simultaneously emit light at the maximum luminance of the self-luminous elements which is higher than the normal maximum luminance.

The values given herein are examples, and the maximum current value in the boost mode, the maximum number of pixels to which the boost mode is applied, and the like may be set as appropriate depending on the design of the display device 50. For example, in order to display a video of the sun, the luminance may be required to be set 100 times higher in the boost mode than in the normal mode. Even in this case, when the number of pixels to which the boost mode is applied is suppressed to 1% or smaller of the total number of pixels, a maximum value of a total current thereof can be suppressed to be equal to or smaller than two times larger than a maximum value of a total current in the normal mode.

A bright spot being wide and dazzling may hinder viewing, and hence even in consideration thereof, the maximum value of the total current at a time of using the boost mode may be suppressed to be equal to or smaller than about 1.5 to about 2.5 times larger than the maximum value of the total current in the normal mode.

The boost region identification module 21 identifies the boost region while limiting the boost region so that the number of pixels to which the boost mode is to be applied is equal to or smaller than a preset maximum number of applicable pixels. For example, a condition for identifying the boost region is changed so that the number of pixels in the boost region is equal to or smaller than the maximum number of applicable pixels. For example, in the above-mentioned first method regarding the identification of the boost region, the exposure condition for obtaining the video of an auxiliary video signal by photography can be changed so that the number of pixels in the boost region is equal to or smaller than the maximum number of applicable pixels. Further, for example, in the second method, a threshold value for luminance can be set so that the number of pixels in the boost region is equal to or smaller than the maximum number of applicable pixels. When a high-luminance region in the video is too wide to limit the number of pixels in the boost region to be equal to or smaller than the maximum number of applicable pixels, the boost mode is not required to be used.

In another case, after a boost candidate region that is a candidate for the boost region is first determined under a predetermined condition, pixels to which the boost mode is to be applied may be selected from within the boost candidate region. For example, in the above-mentioned first method regarding the identification of the boost region, the video of an auxiliary video signal is obtained by photography under a predetermined low exposure condition, and the boost candidate region may be determined based on this auxiliary video signal. For example, when the number of pixels in the boost candidate region is equal to or smaller than the maximum number of applicable pixels, the boost mode is applied to all the pixels in the boost candidate region. When the number of pixels in the boost candidate region exceeds the maximum number of applicable pixels, pixels having high priority, for example, pixels the number of which is equal to or smaller than the maximum number of applicable pixels in descending order of the luminance value may be selected as the pixels to which the boost mode is to be applied. In another case, pixels in a whole region representing a bright spot including a pixel having the highest luminance value are selected as the pixels to which the boost mode is to be applied, and subsequently in the same manner, pixels in regions representing bright spots including pixels having higher luminance values may be selected as the pixels to which the boost mode is to be applied in order until the maximum number of applicable pixels is reached. In another case, depending on a type of a bright spot identified from a video, the pixels to which the boost mode is to be applied may be selected, for example, with priority being given to natural objects over artificial objects, or vice versa. In another case, when the number of pixels in the boost candidate region is too large to identify the order of priority, no pixels may be selected as the pixels to which the boost mode is to be applied, and the boost mode is not required to be used.

<Second Limitation Method>

The following operation may be performed for the purpose of suppressing the total power consumption in the same manner as in the first limitation method. In the first limitation method, the limitation is performed in terms of the number of pixels so that the number of pixels to which the boost mode is to be applied is limited to be equal to or smaller than the maximum number of applicable pixels, while in a second limitation method, the limitation may be performed based on the total power consumption. That is, a total sum of products of the luminance in the boost mode and the number of pixels therefor may be limited to be equal to or smaller than a predetermined value. For example, the boost region may be identified in a suppressed manner so that the sum is equal to or smaller than a predetermined value. In another case, while all pixels that can be included in the boost region are set as the pixels to which the boost mode is to be applied, the luminance of each of the pixels to which the boost mode is to be applied may be suppressed so that the total sum is equal to or smaller than a predetermined value.

<Third Limitation Method>

The light emission in the boost mode may shorten a life of the self-luminous element. In view of this, the use of the boost mode can be limited so that each self-luminous element cannot continuously emit light in the boost mode for a predetermined time period or longer. In addition, a cumulative time period of the light emission of each self-luminous element in the boost mode can be managed, and when the cumulative time period exceeds a predetermined cumulative time period, the use of the boost mode can be limited.

For example, the condition for identifying the boost region may be set stricter when a continuous light-emitting time period or a cumulative light-emitting time period in the boost mode exceeds a predetermined value. In addition, when the continuous light-emitting time period or the cumulative light-emitting time period in the boost mode exceeds the predetermined value, the boost mode is not required to be applied to pixels relevant thereto. Further, when an object the area of which is small, such as a particularly bright star, is displayed, use of the pixels each having the continuous light-emitting time period or the cumulative light-emitting time period in the boost mode exceeding the predetermined value may be avoided to perform the display in the boost mode through use of other neighboring pixels, irrespective of occurrence of some positional displacement. In another case, when the display of the same video continues for a long period of time, the display in the boost mode may be performed while pixels for use are periodically shifted slightly so as to prevent the continuous light-emitting time period or the cumulative light-emitting time period in the boost mode from exceeding the predetermined value.

For example, in a case of flickering light such as light from a twinkling star or rotating light from a lighthouse, the continuous light-emitting time period or the cumulative light-emitting time period may be managed through use of average luminance, namely, an average electric current, within a certain period of time.

[Regarding Creation of Output Signal]

A relationship between the video signal acquired by the video signal acquisition module 11 and the output signal created by the output signal creation module 13 is described.

When the video signal acquired by the video signal acquisition module 11 is computer graphics (CG), the video signal may be created with the use of the boost mode being assumed in advance. For general display (display in the normal mode only), flare is often drawn to express that a high-luminance bright spot has high luminance. Meanwhile, when the display system 1 according to this embodiment is used, it suffices to include data for designating a spot having high luminance in the video signal without drawing flare.

In the processing step of Step S3, the boost video creation module 22 creates a boost mode video signal, which is a video signal of only high-luminance spots that uses the boost mode. In the processing step of Step S4, the output signal creation module 13 creates a video signal that is obtained by excluding the high-luminance spots from the video signal acquired by the video signal acquisition module 11 and conforms to the configuration of the display device 50. The output signal creation module 13 outputs this video signal as a first-line video signal to the display device 50 through the signal output module 15. The first-line video signal is, for example, a video signal of 8, 10, 12, or 16 bits for each color. In addition, the output signal creation module 13 uses the boost mode video signal created by the boost video creation module 22 to create a video signal conforming to the configuration of the display device 50. The output signal creation module 13 outputs this video signal as a second-line video signal to the display device 50 through the signal output module 15. The second-line video signal may be, for example, a video signal of 8, 10, 12, or 16 bits for each color, or a video signal having a smaller number of bits.

The display device 50, which has acquired the two-line video signals, displays a normal video by an operation in the normal mode based on the first-line video signal, and displays a video by an operation in the boost mode based on the second-line video signal. For example, the control circuit 58 of the display device 50 refers to a look-up table (LUT) with the first-line video signal being used as input to convert the first-line video signal into a pulse width value. The control circuit 58 inputs this pulse width value to the normal drive circuit 61, and the normal drive circuit 61 drives the display unit 52. The control circuit 58 also refers to the look-up table (LUT) with the second-line video signal being used as input to convert the second-line video signal into a pulse width value. The control circuit 58 inputs this pulse width value to the high-luminance drive circuit 62, and the high-luminance drive circuit 62 drives the display unit 52. As a result, the display device 50 displays a video in which only the high-luminance spots are brightened in the boost mode in addition to the normal video displayed in the normal mode.

For example, when the display device 50 includes the first configuration example described with reference to FIG. 3, the first-line and second-line video signals are as follows. That is, the first-line video signal can include a signal for controlling the operation of the first switching element 75 for each pixel operating in the normal mode. The second-line video signal can include a signal for controlling the operation of the second switching element 77 for each pixel operating in the boost mode.

For example, when the display device 50 includes the second configuration example described with reference to FIG. 4, the first-line and second-line video signals are as follows. That is, the first-line video signal can include a video signal of a general format to be input to the LED driver 82 for each block including only pixels operating in the normal mode. The second-line video signal can include a video signal to be input to the LED driver 82 for each block including pixels operating in the boost mode. The second-line video signal can also include a signal that turns on the switching element 83 connected to each LED driver 82. In this case, the video signal to be input to the LED driver 82 is a signal adapted for operation by the boost power supply 86. The video signal can be a signal representing high luminance for pixels operating in the boost mode, and for pixels operating in the normal mode, a signal adjusted to cancel a voltage by which a drive voltage is higher.

When the video signal acquired by the video signal acquisition module 11 is a video signal relating to a real-world scene and includes such a main video signal as shown in FIG. 5A and such an auxiliary video signal as shown in FIG. 5B, the following is performed. That is, in the processing step of Step S3, the boost video creation module 22 creates a boost mode video signal through use of, for example, such an auxiliary video signal as shown in FIG. 5B. In the processing step of Step S4, the output signal creation module 13 creates a video signal that is obtained by subtracting the high-luminance spots relating to the boost mode video signal from the main video signal acquired by the video signal acquisition module 11 and conforms to the configuration of the display device 50.

In this case, in the video of the main video signal, flare may be reflected in a periphery of a high-luminance spot. The output signal creation module 13 is preferred to perform image processing for suppressing flare resulting from such a high-luminance subject through use of information on the identified high-luminance spot. For example, it is possible to suppress flare by subjecting the video of the main video signal to processing for applying a predetermined blur (shading) or subtraction processing. The output signal creation module 13 outputs the video signal created in this manner as the first-line video signal to the display device 50 through the signal output module 15. In addition, the output signal creation module 13 creates a video signal conforming to the configuration of the display device 50 through use of the boost mode video signal created by the boost video creation module 22. The output signal creation module 13 outputs this video signal as the second-line video signal to the display device 50 through the signal output module 15. The display device 50, which has acquired the two-line video signals, displays the normal video by the operation in the normal mode based on the first-line video signal, and also displays the video by the operation in the boost mode based on the second-line video signal.

Even when the video signal acquired by the video signal acquisition module 11 is a video signal relating to a real-world scene and includes only a main video signal and no auxiliary video signal, the method is basically the same as that described above except for the method of creating a boost mode video signal. In this case, the boost mode video signal can be created based on the main video signal.

Modification Example

In the above-mentioned embodiment, the example in which all the self-luminous elements can emit light at the luminance exceeding the normal maximum luminance and the respective self-luminous elements display the video in the normal mode or display the video in the boost mode has been given, but the present invention is not limited thereto. All the self-luminous elements may be able to emit light at the luminance equal to or lower than the normal maximum luminance, and at least one of the self-luminous elements may be able to perform the boost light emission at the luminance exceeding the normal maximum luminance. In this case, the video display in the boost mode is performed through use of only the self-luminous elements capable of the boost light emission. Further, the display device 50 may be configured such that each self-luminous element for the normal mode, which emits light at the luminance equal to or lower than the normal maximum luminance, and each self-luminous element for the boost mode, which performs the boost light emission, are different elements and videos are displayed in the normal mode and the boost mode through use of the different self-luminous elements.

[Regarding Display System]

According to the display system 1, self-luminous elements are used in the display device 50, and hence it is possible to display a video without black level degradation by completely turning off the self-luminous elements in a black portion. This contrasts with a case of, for example, a liquid crystal display using a backlight, which cannot completely block light. In addition, through the application of the boost mode, the display system 1 can cause bright spots to sharply shine in black display without black level degradation. Under a state in which the boost mode is not applied, appropriate video expression is obtained as in the related art, and the boost mode is used to display sharply shining bright spots on top of the video expression, to thereby be able to achieve video expression that has never existed in the related art.

Further, problems that additional power consumption and additional heat generation occur due to the boost mode are resolved by limiting the pixels to which the boost mode is to be applied, thereby suppressing the additional power consumption and heat generation within certain ranges.

The preferred embodiment of the present invention has been described above, but the present invention is not limited to the embodiment described above. Needless to say, various modifications may be made within the scope of the present invention.

The documents described in the specification and the specification of Japanese application on the basis of which the present application claims Paris convention priority are incorporated herein by reference in its entirety.

The invention claimed is:

1. A display system, comprising:

a display device including a plurality of self-luminous elements; and a control device configured to control an operation of the display device, wherein the control device is configured to cause the display device to:

display a normal video through use of gradations of up to luminance equal to or lower than normal maximum luminance, which is predetermined luminance; and display a part of a video, as required, through use of a boost light emission in which some of the plurality of self-luminous elements are caused to emit light at luminance exceeding the normal maximum luminance, so as to display the video in which the boost light emission is superimposed on the normal video.

2. The display system according to claim 1, wherein the display device is designed to be allowed to cause all the plurality of self-luminous elements to simultaneously emit light at the normal maximum luminance, without being designed to be allowed to cause all the plurality of self-luminous elements to simultaneously emit light at maximum luminance higher than the normal maximum luminance.

3. The display system according to claim 1, wherein the display device is configured to be allowed to change a magnitude of an electric current flowing through each of the plurality of self-luminous elements, and wherein the control device is configured to control, through use of PWM control, a display performed by the display device.

4. The display system according to claim 3, wherein the display device is configured to cause the magnitude of the electric current flowing through the each of the plurality of self-luminous elements to differ between light emission at the luminance equal to or lower than the normal maximum luminance and the boost light emission.

5. The display system according to claim 4, wherein the display device is configured to be allowed to change, for each of the plurality of self-luminous elements, the magnitude of the electric current flowing through the each of the plurality of self-luminous elements.

6. The display system according to claim 4, wherein the display device is configured to be allowed to change, for each block including a plurality of the self-luminous elements, the magnitude of the electric current flowing through the each of the plurality of the self-luminous elements, and wherein the control device is configured to:

perform control so that the magnitude of the electric current flowing through the each of the plurality of the self-luminous elements differs between the block including at least one of the self-luminous elements to be caused to perform the boost light emission and another block; and change a video signal relating to at least one of the plurality of the self-luminous elements so as to cancel the change in the magnitude of the electric current, the at least one of the plurality of the self-luminous elements being included in the block including the at least one of the self-luminous elements to be caused to perform the boost light emission but being kept from performing the boost light emission.

7. The display system according to claim 1, wherein a video signal of the normal video comprises a signal of 8, 10, 12, or 16 bits for each color.

8. The display system according to claim 1, wherein the control device is configured to identify the some of the plurality of self-luminous elements to be caused to perform the boost light emission while limiting the number of self-luminous elements to be caused to perform the boost light emission to a number equal to or smaller than a predetermined number.

9. The display system according to claim 1, wherein the control device is configured to identify the some of the plurality of self-luminous elements to be caused to perform the boost light emission while limiting total power consumption of the some of the plurality of self-luminous elements to be caused to perform the boost light emission to a value equal to or smaller than a predetermined value.

10. The display system according to claim 1, wherein the control device is configured to identify the some of the plurality of self-luminous elements to be caused to perform the boost light emission while limiting a continuous light-emitting time period or a cumulative light-emitting time period during the boost light emission of the some of the plurality of self-luminous elements to a period equal to or shorter than a predetermined time period.

11. The display system according to claim 1, wherein the control device is configured to identify the some of the plurality of self-luminous elements to be caused to perform the boost light emission based on the video that corresponds to a video to be displayed on the display device and that has been acquired by photography under a low exposure condition.

12. The display system according to claim 11, wherein the control device is configured to create a signal relating to the boost light emission based on the video acquired by photography under the low exposure condition.

13. The display system according to claim 1, wherein the control device is configured to identify the some of the plurality of self-luminous elements to be caused to perform the boost light emission based on luminance of the video to be displayed on the display device.

14. The display system according to claim 1, wherein the control device is configured to identify a high-luminance subject by performing image recognition on the video to be displayed on the display device, and cause the high-luminance subject to be displayed by the boost light emission.

15. The display system according to claim 1, wherein the control device is configured to perform image processing for suppressing flare resulting from a subject displayed by the boost light emission in the normal video.

* * * * *